(12) United States Patent
Divoky et al.

(10) Patent No.: US 6,186,521 B1
(45) Date of Patent: Feb. 13, 2001

(54) CHILD SAFETY RESTRAINT FOR A SHOPPING CART

(76) Inventors: David J. Divoky; Donna Divoky; Nicholas M. Divoky, all of 206 Maple Ave., Chardon, OH (US) 44024

( * ) Notice: Under 35 U.S.C. 154(b), the term of this patent shall be extended for 0 days.

(21) Appl. No.: 09/274,024

(22) Filed: Mar. 22, 1999

Related U.S. Application Data

(60) Provisional application No. 60/087,419, filed on Jun. 1, 1998.

(51) Int. Cl.[7] .............................. A47D 1/10; B62B 11/00; B62B 9/24
(52) U.S. Cl. .............................. 280/33.993; 280/33.992; 297/256.17
(58) Field of Search .................. 280/33.992, 33.994, 280/33.991, 33.993; 297/256.17, 37

(56) References Cited

U.S. PATENT DOCUMENTS

| | | | |
|---|---|---|---|
| D. 343,257 | 1/1994 | DiFloria et al. | D29/11 |
| 436,327 | 9/1890 | Archer . | |
| 3,157,432 | 11/1964 | Watkins | 297/254 |
| 3,956,841 * | 5/1976 | Hensel | 280/33.991 |
| 3,992,056 | 11/1976 | Koziatek et al. | 297/250 |
| 4,108,489 | 8/1978 | Salzman | 297/37 |
| 4,324,430 * | 4/1982 | Dimas, Jr. et al. | 280/33.991 |
| 4,682,782 * | 7/1987 | Mills | 280/33.991 |
| 4,685,741 | 8/1987 | Tsuge et al. | 297/467 |
| 4,867,464 * | 9/1989 | Cook | 280/33.993 |
| 5,022,669 * | 6/1991 | Johnson | 280/47.38 |
| 5,312,122 | 5/1994 | Doty | 280/33.992 |
| 5,468,046 | 11/1995 | Weber et al. | 297/238 |
| 5,499,860 | 3/1996 | Smith et al. | 297/255 |
| 5,547,250 | 8/1996 | Childers | 297/256.17 |
| 5,553,877 * | 9/1996 | Huang | 280/33.993 |
| 5,641,200 * | 6/1997 | Howell | 280/33.993 |
| 5,981,891 * | 7/1999 | Russell | 280/33.991 |

* cited by examiner

*Primary Examiner*—Michael Mar
*Assistant Examiner*—Hau Phan
(74) *Attorney, Agent, or Firm*—James A. Lucas; Driggs, Lucas, Brubaker & Hogg Co., L.P.A.

(57) ABSTRACT

A child restraint system for use with shopping carts and the like equipped with a child carrier utilizes a pair of shoulder straps joined at one end to a crotch strap which passes between the legs of a child and attaches to the rear of the cart at the front of the child carrier. The shoulder straps can be quickly and easily adjusted vertically to accommodate children of different sizes in the carrier. The restraint system can be retrofitted onto an existing carrier-equipped cart, or can be integrated into the design of the cart.

11 Claims, 5 Drawing Sheets

CHILD SAFETY RESTRAINT FOR A SHOPPING CART

CROSS REFERENCE TO RELATED APPLICATION

This application claims the benefits of Provisional Application Ser. No. 60/087,419, filed Jun. 1, 1998.

FIELD OF THE INVENTION

This invention relates to a cart, particularly a shopping cart of the type commonly found in grocery and department stores. More specifically, it relates to carts which are equipped with carriers which permit the user to tote a child around on the cart during an excursion through the store.

BACKGROUND

Shopping carts are a common sight in virtually all grocery stores and supermarkets. They are used by shoppers who are purchasing more than a handful of items. Most carts are equipped with a carrier used to transport infants and small children accompanying the shopper. The carrier may be an integral part of the shopping cart. Alternatively, the cart may be retrofitted with a separate carrier mounted to or on the cart and secured thereto with straps or hardware.

In many instances, the child carrier does not include any type of a restraint system which would serve to prevent the child from climbing or falling out of the carrier. In other instances, the restraint system may prevent falls when the child is sitting, but is deficient in preventing the child from standing up and then falling. Because of the deficiencies in these systems, there are numerous instances each year across the United States of children climbing or falling out of the carrier, resulting in injuries ranging from bruises and broken bones to more serious life threatening injuries or even fatalities.

A number of prior efforts have been made to equip a child carrier on a shopping cart with a restraint system to restrict the movement of the child while in the carrier. One such carrier is described in U.S. Pat. No. 4,108,489. This carrier is equipped with side flaps which serve to prevent a child from falling laterally to either side of the cart. The device is designed to be permanently attached to the cart, or to be collapsed into a folded seat which can be easily carried by a shopper for attaching to a cart upon entering a store.

U.S. Pat. No. 5,312,122 describes a cart attachment for improving the child carrying capabilities of the cart. The attachment includes a back guard and harness system for preventing a child from standing up and/or turning around while in the seat of the cart carrier.

U.S. Pat. No. 5,547,250 describes a cushioned child restraint and seating device for use with a shopping cart. The device includes a horizontal seat member and a back rest. A pad having wing members is attached to the back rest and is adapted to wrap around a child's torso to secure the child against the back rest.

U.S. design Pat. No. 343,257 is an ornamental design for a child safety harness having a single attachment to the rear of a shipping cart.

SUMMARY OF THE INVENTION

The present invention relates to the combination of a wheeled shopping cart including a basket for holding merchandise such as groceries, a handle for pushing and maneuvering the cart and a carrier for carrying infants and small children. The carrier includes a back support, a seat, and openings through which the legs of the infant extend. The improvement involves a child restraint associated with the carrier and comprises front and rear panels sandwiching the back support between them; The panels and the back support are fastened using fastening means such as nuts and bolts extending through the back support to join the panels. A pair of shoulder straps are removably and vertically adjustably secured to the panels and means such as a crotch strap is used to join the shoulder straps to the cart at the front of the seat. The panels each have two rows of vertically spaced horizontal slots to receive a first end of the shoulder straps with the slots in the front panel aligned with those in the back panel. The first end of each strap is secured against removal from the slots.

The invention also relates to a child restraint for use with the child carrier of a shopping cart or the like. The restraint comprises a) front and rear panels adapted to sandwich the back support of the child carrier, b) fastening means such as nuts and bolts to couple the panels together and to secure the panels to the back support, c) a pair of shoulder straps having a first end joined to the panels and a second end coupled together, and d) a crotch strap having one end joined to the second end of the shoulder straps, and a free end adapted to be secured to the cart. The front and the rear panels each have two rows of vertically spaced horizontal slots to receive a first end of the shoulder straps with the slots in the front panel linearly aligned with the slots in the rear panel and the slots in the first row aligned horizontally with the slots in the second row. The first end of one shoulder strap removably passes through the slots in the first row of the front and rear panels, and the first end of the second shoulder strap removably passes through the slots in the other row of the front and rear panels. The first ends of the shoulder straps are secured against removal from the slots.

The invention further comprises a mobile shopping cart including a child carrier having a seat and a back, and a restraint system to prevent a child from falling from the cart. The restraint system comprises shoulder strap means preferably comprising two shoulder straps, each strap adapted to pass over one shoulder of a child, each shoulder strap having first and second ends. The restraint system includes means to removably secure the first end of each shoulder strap to the back of the carrier. The second end of each shoulder strap is connected at a common point with the second end of the other shoulder strap. A crotch strap has a first end connected at the common point to the shoulder straps and a second end adapted to pass between the legs of a child. Means such as a snap fastener is used to join the second end of the crotch strap to the frame of the cart. The crotch strap cooperates with the shoulder straps to prevent the child from standing while restrained by the restraint system. The restraint system includes means to allow vertical height adjustment of the shoulder straps wherein the first end of the shoulder straps are removably secured to the back of the carrier. The back of the carrier includes two rows of vertically aligned, spaced-apart adjustment slots to receive the first end of each of the shoulder straps. The back can comprise a solid panel, or a wire grid sandwiched between a pair of panels secured to one another. In another variation, the back may comprise a wire grid including a plurality of vertically extending rods spaced from one another, in which case the first end of each shoulder strap is removably secured to one of the vertically extending rods.

DETAILED DESCRIPTION

Figure 1:
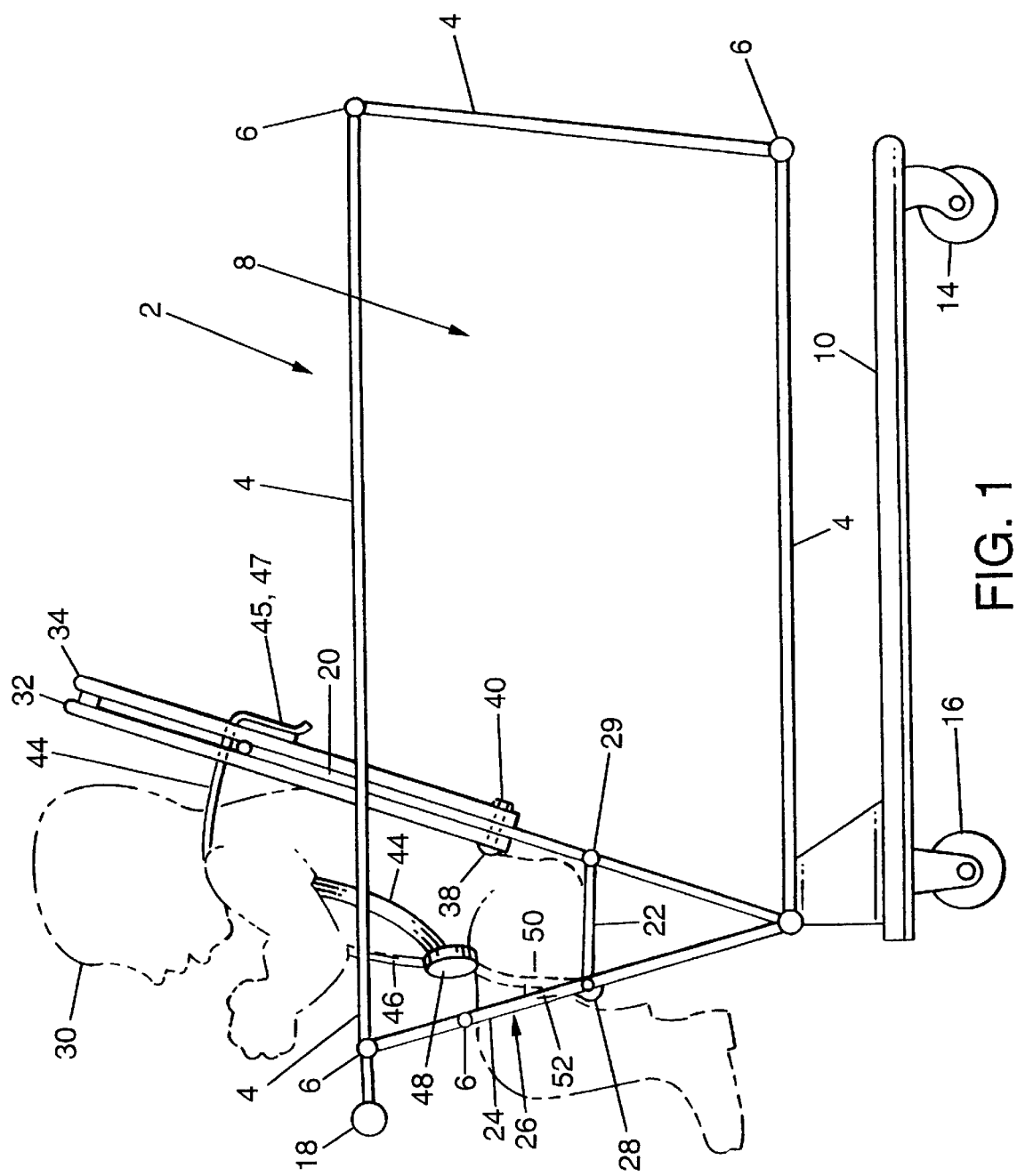
FIG. 1 is a side elevational view of a shopping cart showing the child restraint of the present invention, and the child carrier partially in cross-section.

This invention relates to a novel child restraint system for use with a shopping cart. The system is useful with a cart of the type shown in FIG. 1. The cart 2 generally is comprised of a gridwork of wires 4 welded or brazed together and attached to a frame 6. The cart comprises a basket 8 cantilevered over a bottom carrier 10 used to carry bulk or heavy items.

The frame is secured to four wheels 14 and 16 with the front wheels 14 being pivotal to provide mobility to the cart. The rear wheels 16 typically are on a fixed axis.

The cart includes a handle 18 for pushing and pulling the cart, and a child carrier comprising a wire grid back support 20 connected by a wire cross member 29 to a seat 22. A support 24 extends diagonally between the handle and the frame member forming the front of the seat 22. The support 24 serves to form two openings 26, through which the legs of the child extend. All of these details represent standard cart design features. Shown in outline is a child 30 in the seat.

Figure 2:
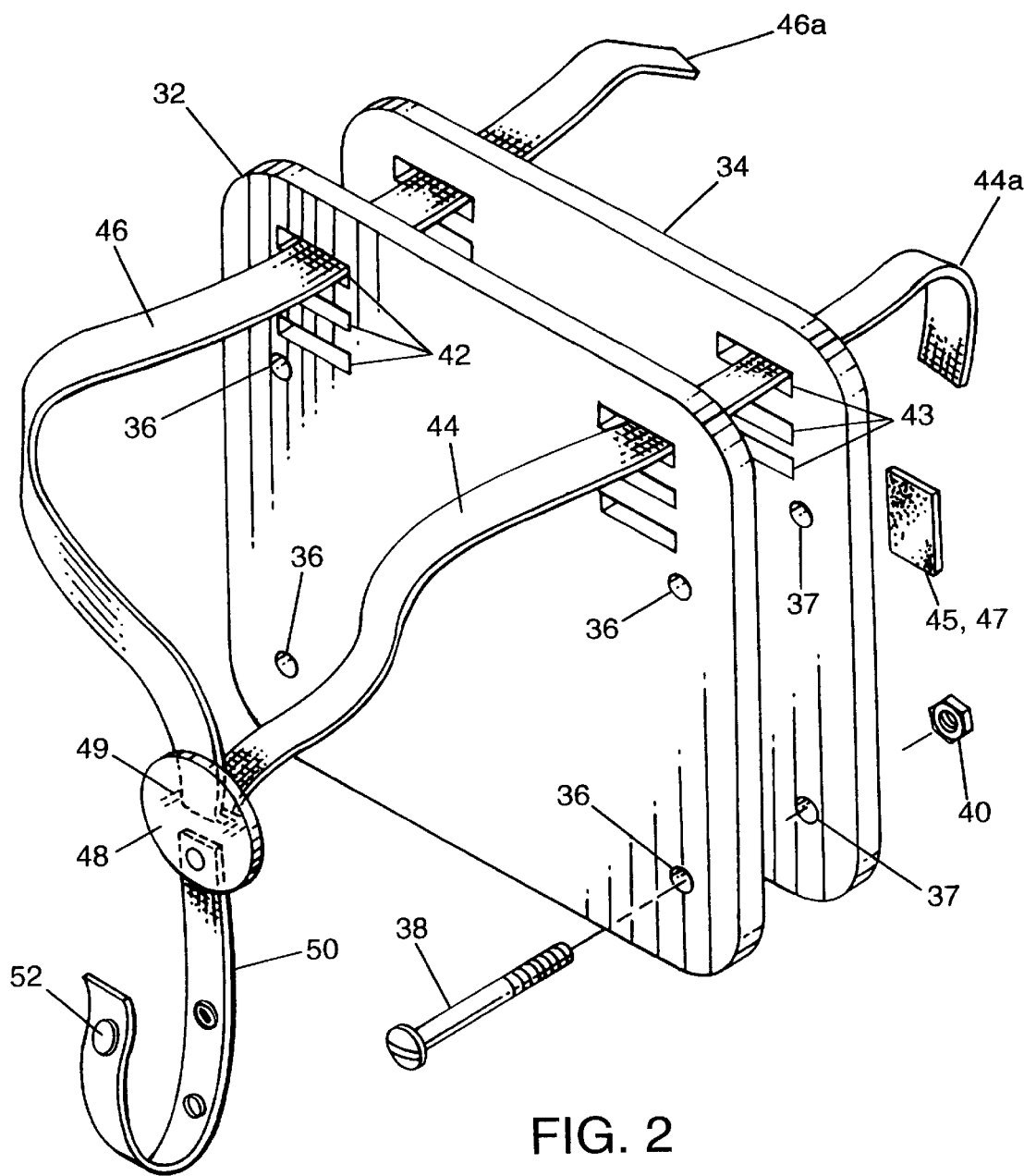
FIG. 2 is a perspective view showing the component parts of the child restraint.

Referring to FIG. 2, the invention comprises a first panel 32 and a second panel 34 which are placed on either side of the wire back support 20. Holes 36 through the first panel and holes 37 through the second panel are adapted to receive bolts 38, and nuts 40 or other fasteners such as screws or rivets. The fasteners pass through the wire back support 20 and are tightened to hold the panels 32, 34 in place. As noted in FIG. 1, the panels extend above the wire back support 20 and have at least one, and preferably two or more slots, 42, 43 vertically aligned on either side of the panels to receive shoulder straps 44, 46. The free ends 44a and 46a of the straps 44 and 46 are modified by straps of Velcro 45, 47 or other fastening or securing means to prevent their unintended withdrawal from the slots. This prevents the unwanted removal of the straps from the panels. The other ends of the straps are joined by a ring 48 to a leg or crotch strap 50 which includes a snap fastener 52 or Velcro or other suitable fastening means. This fastener loops around the wire seat frame member 28 which forms the front of the seat 22 connected to diagonal support 24.

The shoulder straps 44, 46 restrain the child from standing up in the carrier, thereby preventing the child from falling from the carrier and sustaining a life threatening injury. The use of the panels permits the restraint system to be vertically adjusted to accommodate for differences in design and dimension of various shopping carts. The vertically spaced slots in the panels permit the height of the shoulder straps to be adjusted to accommodate children of varying heights. This is done by removing the Velcro fasteners, removing the straps from one pair of slots and repositioning the straps in another pair of pair of slots.

Figure 3:
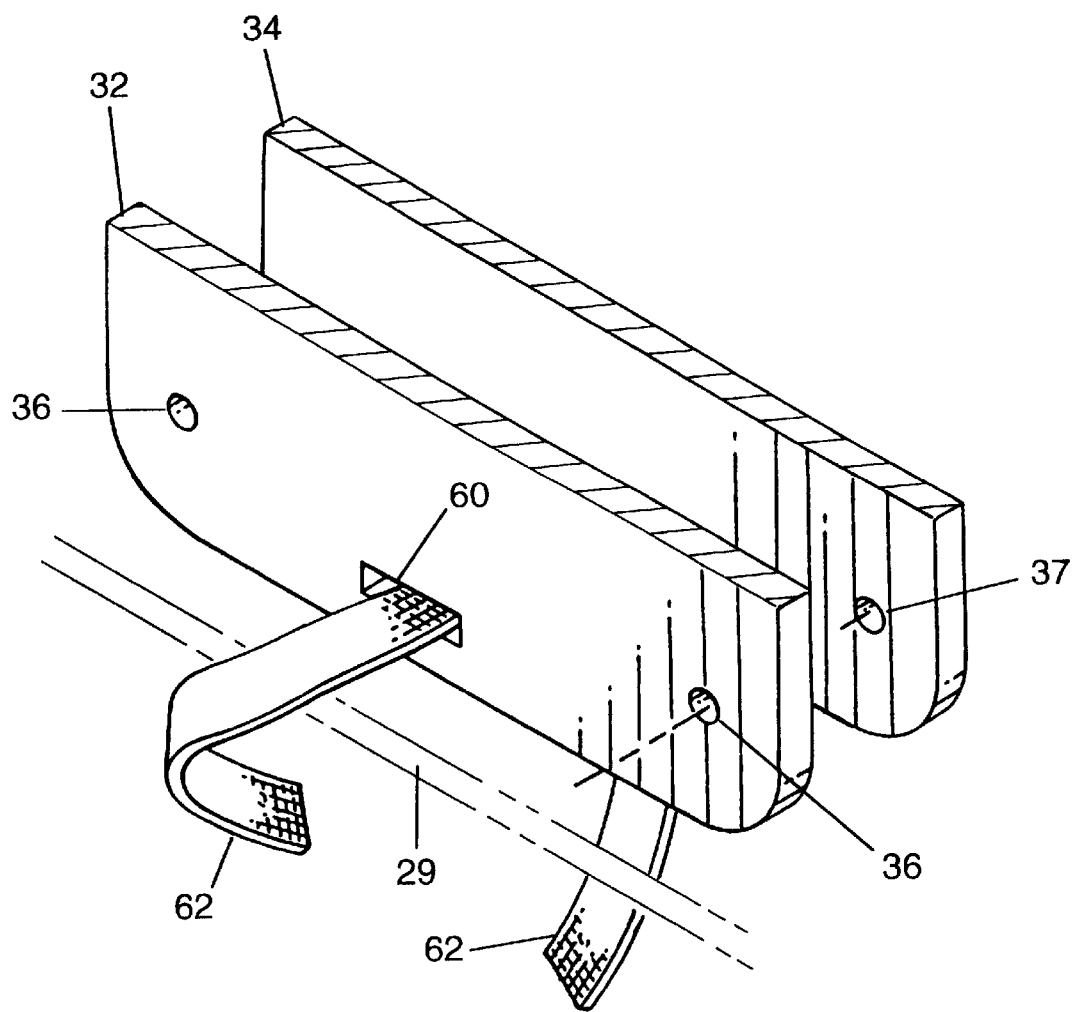
FIG. 3 is a partial perspective view showing a modification of the carrier.

FIG. 3 shows a modification wherein one or more slots 60 extend through the base of the panels 32, 34. A strap 62 with a buckle, slide fastener, Velcro or other securing means (not shown) is inserted into each bottom slot and through the back support 20 to secure the panels to the wire cross member 29 of the cart frame and to prevent the panels from lifting in the event the child or infant attempts to stand up while strapped in the carrier. Holes 36, 37 receive bolts (not shown) to secure the panels together.

Figure 4:
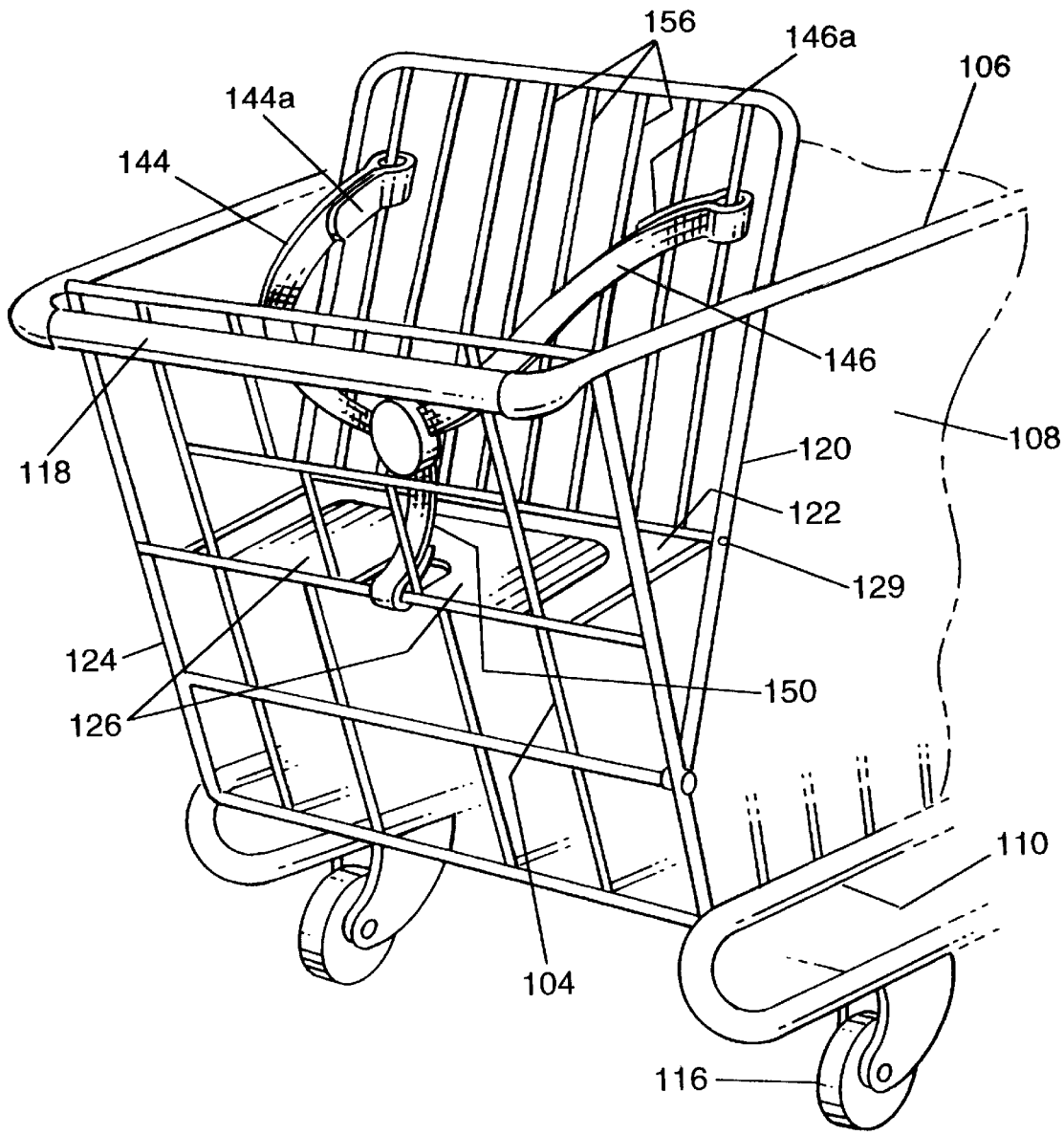
FIG. 4 is a perspective view of a shopping cart with the restraint system integral therewith.

Turning now to FIG. 4, the rear portion of a shopping cart 102 similar in construction to the cart configuration shown in FIG. 1, is shown. The cart comprises a wire frame 106 and a basket 108 (partially shown). The basket is cantilevered over a bottom carrier 110. The frame 106 is mounted on four wheels comprising two back wheels 116 as shown and 2 front wheels, not shown. The carrier comprising a wire back support 120 connected by a wire cross member 129 and a seat 122. A support 124 extends diagonally between a cart handle 118 and the front of the seat 122. The support 124 forms two openings 126, through which the legs of the child extend. All of these details represent standard cart design features. The wire back support 120 extends vertically higher than the corresponding back support 12 in FIG. 1. The support 120 contains a plurality of spaced vertical support rods 156 to form a plurality of rectangular openings. A child restraint comprises a pair of shoulder straps 144, 146 connected at a common point to a crotch strap 150. The free ends 144a, 146a of the shoulder straps are looped around one of the vertical rods and are secured therearound with Velcro strips (one of which is shown as 145) or other suitable means such as snap fasteners. The height at which the shoulder straps are positioned can be quickly and effectively changed by sliding the loops up and down the vertical rods 156.

Figure 5:
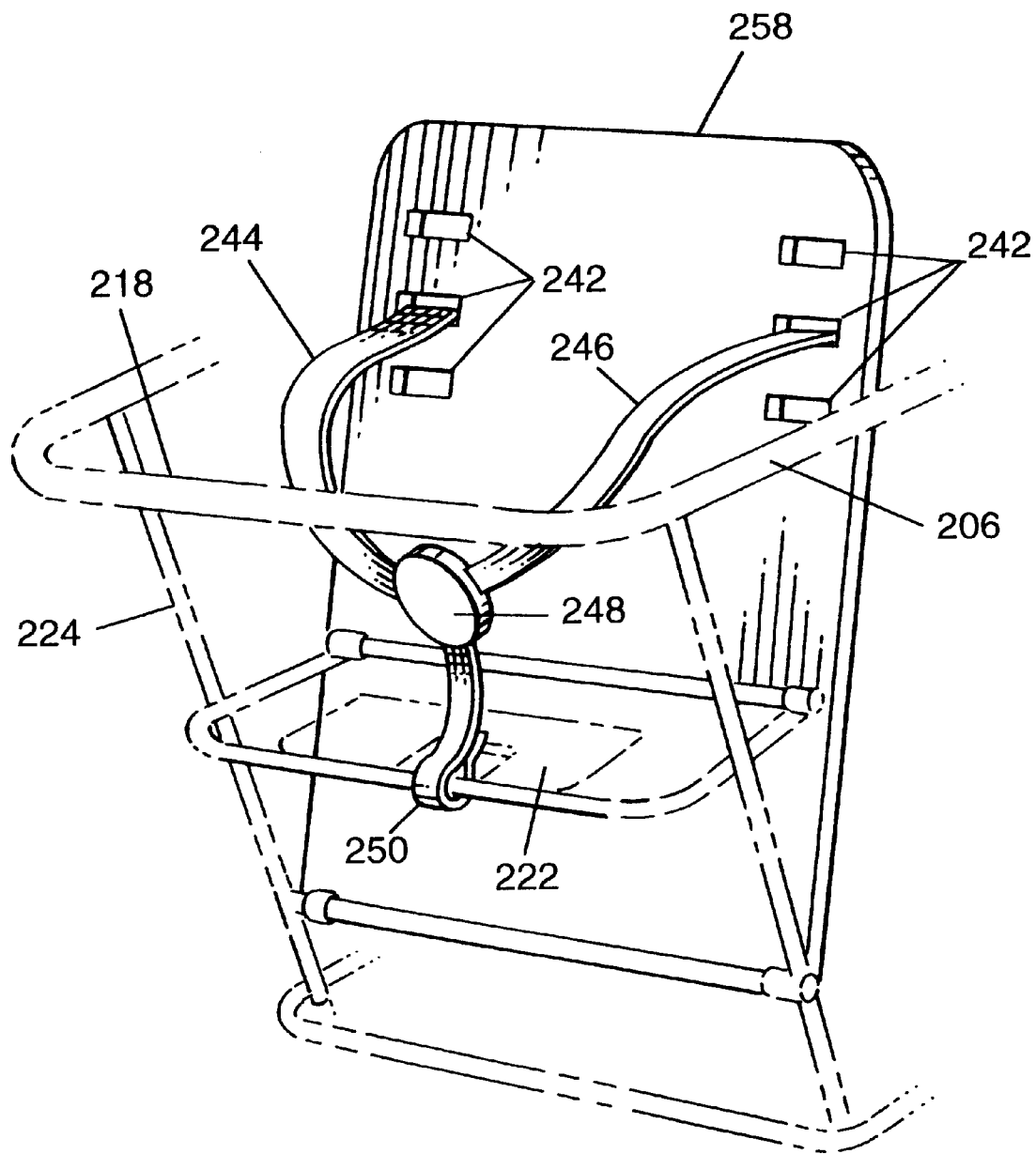
FIG. 5 is another perspective view with the restraint system of the present invention useful as an integral part of the cart.

FIG. 5 shows another construction of the shopping cart wherein the back of the child carrier is made from a panel 258 of wood, plastic or other similar rigid or semi-rigid material. The panel 258 is provided with several vertical slots 242 on either side. As before, the child restraint comprises a pair of shoulder straps 244, 246, and a crotch strap 250 joined together at a common point 248 to a ring or the like. One end of each shoulder strap passes through a predetermined slot 242 in the panel 258, to permit the height adjustment of the shoulder straps 244, 246 depending on the size of the child, and is secured against removal from the slot. The crotch strap 250 has one end secured by a snap fastener or Velcro or the like to the front of the seat 222. The cart includes a handle 218 and supports 224 between the handle and the seat 222. The frame 206 of the cart is similar in design and construction to those previously described.

Typically, back panels having a planar dimension of about 10" wide by about 14" high would fit the largest shopping cart presently in use. However, the precise dimensions of the panels is not a critical element of the invention. Instead, the optimum panel size can be larger or smaller depending on the size and other design parameters of the cart as well as the materials of construction used for the restraint system.

Instead of a ring, a plastic holder, such as one having three lobes, each of which includes a slot through which an end of one of the two shoulder straps or the leg strap, may be used.

Other modifications can be made without departing from the scope of the present invention. For example the shoulder straps may comprise a single strap which passes through slot 42, and extends along the back of the panel 34, and through slot 43, with both ends of the strap being secured to ring 48. Alternatively, a single strap can be looped through ring 48 with the two ends passing through slots 42 and 43 respectively, each one being anchored at the back of panel 34. The shoulder straps can be padded for comfort.

It is contemplated that the components of the restraint system are made of readily available materials. For example, the straps can be made from canvas, hemp, cotton or a synthetic polymeric material such as nylon or polypropylene. They typically are ½" to 1" in width. The back panel or panels can be fabricated from plywood, particle board or wood veneer. Alternatively they can be molded from rigid plastic or fiberglass molding compositions, or can be machined into shape from solid plastic pieces. As yet another choice, they can be made from lightweight metal such as aluminum. They can be padded and/or covered with vinyl or cloth for comfort. The hardware such as the hook and loop fasteners, the snaps, the nuts and bolts and ring preferably is made from stainless steel or aluminum, or from a suitable structural plastic. The snap fastener can readily be replaced with a metal or plastic snap which can be engaged or disengaged from the cart frame.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. In combination;
   a wheeled shopping cart including a basket for holding merchandise such as groceries, a handle for pushing and maneuvering the cart and a carrier for carrying infants and small children, said carrier including a back support, a seat, and openings through which the legs of the infant extend, the improvement comprising:
   a child restraint associated with the carrier and comprising front and rear panels sandwiching the back support therebetween and extending above the back support;
   fastening means extending through the back support to join the panels;
   a pair of shoulder straps secured to the front and rear panels, each panel having first and second rows of vertically spaced slots to receive therethrough a first end of the shoulder straps with the slots in the front panel being linearly aligned with the slots in the rear panel, and the slots in the first row being aligned horizontally with the slots in the second row, each strap having a first end passing through a slot in one of the vertically spaced rows in each of the front and rear panels; and
   means for joining the shoulder straps to the cart at the front of the seat.

2. The combination according to claim 1 wherein the front and the rear panels each have two rows of vertically spaced slots to receive a first end of the shoulder straps with the slots in the front panel linearly aligned with the slots in the rear panel and the slots in the first row aligned horizontally with the slots in the second row.

3. The combination according to claim 1 wherein the first end of one shoulder strap removably passes through a slot in the first row of the front and rear panels, and the first end of the second shoulder strap removably passes through a slot in the second row of the front and rear panels, and the first end of each shoulder strap is secured against removal from the respective slot.

4. The combination according to claim 1 wherein the second end of each of the two shoulder straps is joined to a crotch strap, and the crotch strap joins the shoulder straps to the front of the seat.

5. The combination according to claim 4 wherein the second end of the two shoulder straps are joined together to form a one piece shoulder strap.

6. A child restraint for use with the child carrier of a shopping cart, said carrier having a back support, said restraint comprising
   a) front and rear panels adapted to sandwich therebetween the back support of the child carrier and extending above the back support, said front and the rear panels each have first and second rows of vertically spaced slots to receive therethrough a first end of a shoulder strap with the slots in the front panel being linearly aligned with the slots in the rear panel, and the slots in the first row being aligned horizontally with the slots in the second row;
   b) fastening means to couple the panels together and to secure them to the back support therebetween;
   c) a pair of shoulder straps, each strap having a first end releasably joined to the panels and a second end coupled together; and
   d) a crotch strap having one end joined to the second end of the shoulder straps and a free end adapted to be secured to the cart.

7. The child restraint according to claim 6 wherein the fastening means comprise a plurality of nuts and bolts.

8. The child restraint according to claim 6 wherein the first end of one shoulder strap removably passes through the slots in the first row of each of the front and rear panels, and the first end of the second shoulder strap removably passes through the slots in the other row in each of the front and rear panels, and the first ends are secured against removal from the slots.

9. The child restraint according to claim 6 wherein the second end of the two shoulder straps are joined to a crotch strap which joins the shoulder straps to the front of the seat.

10. The child restraint according to claim 9 wherein the second end of the two shoulder straps are joined together to form a one piece shoulder strap having two free ends, each passing through a slot in one row.

11. A mobile shopping cart including a child carrier having a seat and a back, and a restraint system to prevent a child from falling from the cart, the restraint system comprising a pair of shoulder straps, each adapted to pass over one shoulder of a child, each shoulder strap having first and second ends, the back comprising a wire grid sandwiched between a pair of panels secured to one another, means comprising a first row and a second row of vertically and horizontally aligned, spaced-apart adjustment slots wherein the adjustment slots in the front panel are linearly aligned with the slots in the rear panel, and the slots in the first row are aligned horizontally with the slots in the second row, each strap having a first end passing through the wire grid to secure the first end of each shoulder strap to the back of the carrier so as to allow vertical height adjustment of the shoulder straps where the first end of each shoulder strap is removably secured to the back of the carrier, the second end of each shoulder strap connected at a common point with the second end of the other shoulder strap, a crotch strap having a first end connected at the common point to the shoulder strap, and a second end adapted to pass between the legs of a child, means for joining the second end to the frame of the cart, the crotch strap cooperating with the shoulder strap means to prevent the child from standing while restrained by the restraint system.

* * * * *